United States Patent [19]

Fukushima et al.

[11] Patent Number: 5,038,242
[45] Date of Patent: Aug. 6, 1991

[54] MAGNETIC HEAD CONTAINING A BARRIER LAYER

[75] Inventors: Nobuto Fukushima; Eigo Hashimoto; Junji Satoh; Mari Kondoh, all of Tokorozawa, Japan

[73] Assignee: Citizen Watch Co., Ltd., Tokyo, Japan

[21] Appl. No.: 351,051

[22] Filed: May 12, 1989

[30] Foreign Application Priority Data

May 13, 1988 [JP] Japan .................. 63-114736
Dec. 20, 1988 [JP] Japan .................. 63-321279
Apr. 14, 1989 [JP] Japan .................. 1-94452

[51] Int. Cl.$^5$ ............... G11B 5/235; G11B 5/147
[52] U.S. Cl. .................. 360/120; 360/126
[58] Field of Search ................. 360/120, 126

[56] References Cited

U.S. PATENT DOCUMENTS

| | | | |
|---|---|---|---|
| 4,265,684 | 5/1981 | Boll | 360/120 |
| 4,413,295 | 11/1983 | Kato et al. | 360/120 |
| 4,581,080 | 4/1986 | Meguro et al. | 420/82 |
| 4,670,807 | 6/1987 | Gorter et al. | 360/120 |
| 4,671,828 | 6/1987 | Yamauchi et al. | 420/78 |
| 4,683,012 | 7/1987 | Yamauchi et al. | 420/78 |
| 4,698,273 | 10/1987 | Komuro et al. | 428/682 |
| 4,755,899 | 7/1988 | Kobayashi et al. | 360/122 |
| 4,881,989 | 11/1989 | Yoshizawa et al. | 420/89 |
| 4,887,177 | 12/1989 | Sillen | 360/120 |
| 4,953,049 | 8/1990 | Okuda et al. | 360/120 |

FOREIGN PATENT DOCUMENTS

| | | |
|---|---|---|
| 55-157121 | 12/1980 | Japan . |
| 63-8524 | 2/1988 | Japan . |
| 63-39106 | 2/1988 | Japan . |
| 63-91811 | 4/1988 | Japan . |

OTHER PUBLICATIONS

IEEE Transactions on Magnetics, vol. 24, No. 2, Mar., 1802-1804 (1988).

Primary Examiner—John H. Wolff
Assistant Examiner—Craig A. Renner
Attorney, Agent, or Firm—Birch, Stewart, Kolasch & Birch

[57] ABSTRACT

A Metal-In-Gap head is disclosed. A barrier layer of iron-silicon alloy is formed on a surface of a gap side of a core, and a sendust layer is formed on the surface of the barrier layer. A gap layer of nonmagnetic material is disposed between the surface of the sendust layer and a surface of another core.

5 Claims, 5 Drawing Sheets

ID A BARRIER
MAGNETIC HEAD CONTAINING A BARRIER LAYER

BACKGROUND OF THE INVENTION

The present invention relates to a magnetic head of the type which has a metal in a gap, called a Metal-In-Gap head.

A magnetic head used in magnetic storage having a large capacity is required to have a very small gap length and a small track width so as to provide a high density storage. A small gap length is, for example, 0.5 μm or less. In addition, the coercive force of the storage medium has increased in recent years.

Accordingly, if a magnetic head having a small gap length and small track width is made of a magnetic oxide, such as ferrite, a sufficient magnetic flux density is not obtained, so that the magnetic conversion characteristics such as the overwrite characteristic, the time margin characteristic, the reproduction power and the like, are reduced.

On the other hand, it is difficult to manufacture the above described magnetic head of a metallic, magnetic material such as permalloy or sendust which provides a high saturation magnetic flux density, because of the difficulties in workability and low wear resistance.

Japanese Patent Application Laid-open 55-157121 discloses a Metal-In-Gap head (called hereinafter MIG head) in which a metallic, magnetic thin film is formed on the surfaces of the gap between a pair of ferrite cores so as to solve the above described problems.

FIG. 7 shows an example of the MIG head. The MIG head has a pair of ferrite cores 1 and 4. A metallic, magnetic thin layer 3 which has a higher saturation magnetic flux density than the core material is formed on a surface of the core 1. Between the thin layer 3 and the core 4, a gap layer 5 of nonmagnetic material is formed. Both cores 1 and 4 are joined by a glass joint 6. As for the metallic magnetic thin layer 3, sendust is preferable, because it has excellent magnetic characteristics and excellent heat resistance characteristics against the heat used in the glass joining operation.

However, a magnetic deteriorated layer 7 which deteriorates in coercive force and permeability is formed in the boundary zone between the ferrite core 1 and the thin layer 3. The layer 7 thus acts as a pseudo gap.

It is considered that the magnetic deterioration is caused by two reasons as described hereinafter.

The first is that the crystal structure of an initial layer of the sendust thin layer becomes irregular at the formation thereof. The second is that magnetically deteriorated substances are formed in the boundary zone by the thermal diffusion of components of ferrite and sendust, which is caused by the heat used in the glass joint is formed.

The magnetic deteriorated substances which are formed are, for example, oxides of aluminum in the sendust which is caused by oxygen in the ferrite. It is known that the thickness of the magnetic deteriorated layer 7 is about 0.2 μm which is a considerable value compared with the gap length which is the thickness of the gap layer 5.

The pseudo gap formed by the deteriorated layer 7 produces a false reproduction output which is added to the reproduction output depending on the main gap, causing reproduction error.

As a method for preventing the influence of the pseudo gap, the interface between the ferrite and the sendust is so disposed as to make an angle with the gap forming surface (Japanese Patent Publication 63-8524).

This head prevents the influence of the pseudo gap through an azimuth loss. However, in order to provide such an interface, the sendust layer must be increased in thickness. In addition, although the error output is reduced, the head efficiency is not improved (IEEE TRANSACTIONS ON MAGNETICS, Vol. 24, No. 2, March, 1802–1804 (1988)).

Another method that has an intermediate layer such as permalloy disposed between sendust and ferrite is disclosed in Japanese Patent Applications Laid-open 63-91811 and 63-39106. However, the permalloy causes oxygen in the ferrite to diffuse at a temperature between 500° C. and 750° C. upon joining with glass at the manufacturing of the head, causing a reduction in magnetic characteristics of the sendust.

SUMMARY OF THE INVENTION

The object of the present invention is to provide a magnetic head which prevents the formation of a pseudo gap by interposing a barrier layer between ferrite and sendust.

In accordance with the present invention, the barrier layer includes an iron alloy which suppresses the formation of the pseudo gap.

According to the present invention, there is provided a magnetic head comprising a pair of ferrite cores, a barrier layer of a magnetic alloy including an iron alloy, which is formed on a surface of a gap side of one of the cores, a sendust layer formed on the surface of the barrier layer, and a gap layer of nonmagnetic material, which is disposed between the surface of the sendust layer and the surface on the gap side of the other core.

In one example of the present invention, the iron alloy is an iron-silicon alloy having a silicon concentration between 8 weight percent and 25 weight percent.

In another example of the present invention, the magnetic head has a barrier layer which includes an iron alloy containing nitrogen in an amount of 8 atomic percent and a sendust layer disposed on the barrier layer. The barrier layer is formed by vacuum deposition in the presence of nitrogen and argon.

In another example, the magnetic head has a barrier layer comprising a laminated layer consisting of an iron-silicon alloy layer having a silicon concentration of 14 weight percent and having the thickness of 0.05 μm, and a permalloy layer of 80 wt % iron having a thickness of 0.05 μm. Further, the sendust layer is formed on the laminated barrier structure to form a laminated layer.

In another example, the magnetic head has a barrier layer of iron gallium alloy having a gallium concentration of 16 weight percent and a sendust layer disposed on the barrier layer.

In a further example, the magnetic head has a barrier layer of iron-germanium alloy having a germanium concentration of 14 weight percent and a sendust layer disposed on the barrier layer.

Other objects and features of the present invention will become more apparent from the following detailed description with reference to the accompanying drawings.

BRIEF DESCRIPTION OF DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

EXAMPLE 1

Figure 1:
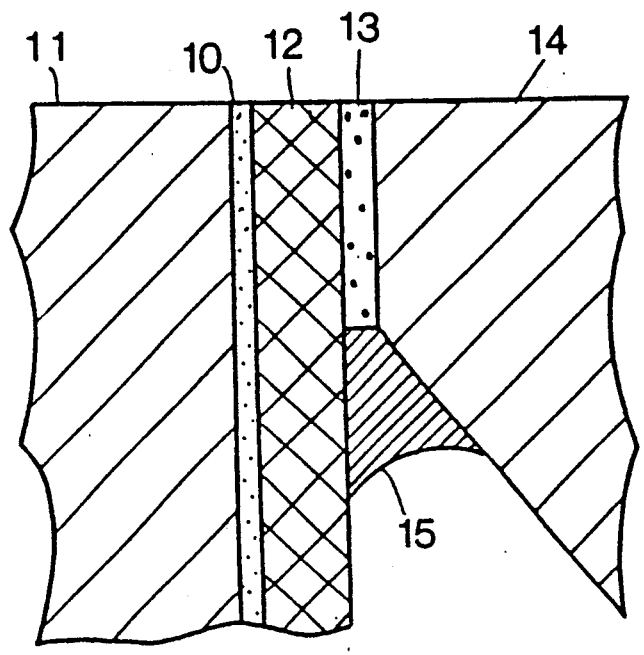
FIG. 1 is a sectional view showing a main part of a MIG head according to the present invention.

Referring to FIG. 1, an MIG head of the present invention has a barrier thin layer 10 formed on a surface of a gap side of a ferrite core 11 on which a sendust thin layer 12 is formed. A gap layer 13 of nonmagnetic material is formed on a surface of a ferrite core 14. Both ferrite cores 11 and 14 are joined by a glass 15.

FIGS. 2a to 2d show a part of a manufacturing process of the MIG head. The barrier thin layer 10 of iron-silicon alloy is formed on the core 11 of manganese-zinc ferrite by a sputtering using a target consisting of 14% silicon and 86% iron. The thickness of the barrier thin layer is about 0.1 μm. The sendust thin layer 12 is formed on the barrier layer 10 up to the thickness of 2.8 μm, by sputtering using a target consisting of 10% silicon, 6% aluminum and 84% iron. Both layers are preferably formed in the same device in sequence.

The gap layer 13 of silicon dioxide is formed on the ferrite core 14 by a PVD (physical vapor deposition) such as vacuum deposition or CVD (chemical vapor deposition) to a thickness corresponding to a predetermined gap length.

Figure 2A:
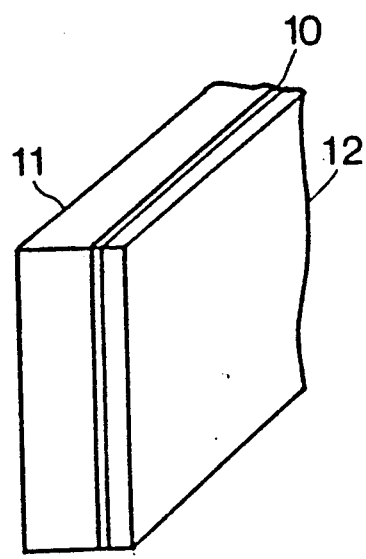
FIGS. 2a to 2d are perspective views showing a part of a manufacturing process of the MIG head.
Figure 2B:
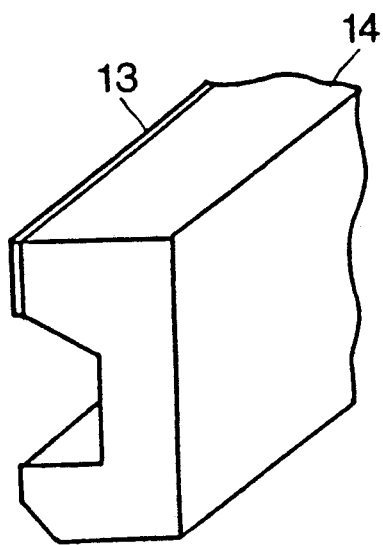
Figure 2C:
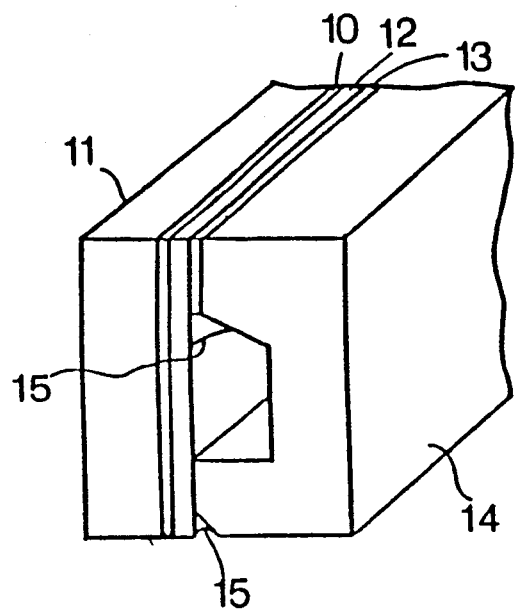
Figure 2D:
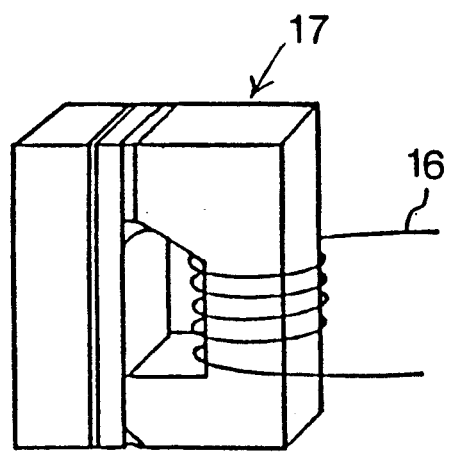

Both cores 11 and 14 abut each other and are joined by glass 15, which has a melting point corresponding to respective joining temperatures for both cores, e.g., a temperature of 600° C. or 700° C. (FIG. 2c). Thereafter, the assembled core is divided into a plurality of individual head cores 17 (FIG. 2d) by a slicing process. A coil is wound on the core 17 to produce a MIG head as shown in FIG. 2d.

Figure 7:
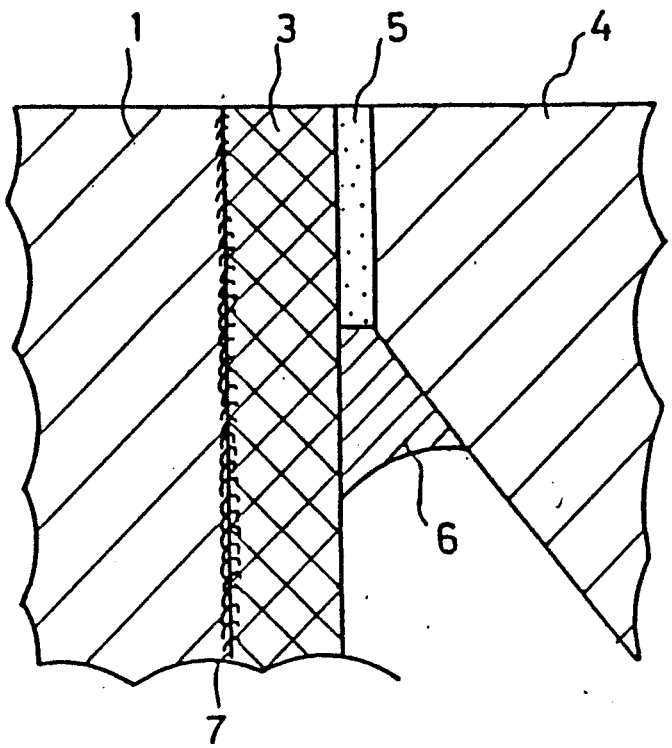
FIG. 7 is a sectional view partly showing a conventional MIG head.

It was confirmed that the MIG head manufactured by the above method produces a reproduction output including a slight pseudo reproduction output which is close to a noise level. However, the pseudo reproduction output is very small compared with the conventional MIG head shown in FIG. 7.

Table 1 shows the coercive force Hc of the barrier layer 10 of silicon-iron alloy on the manganese-zinc ferrite core. The thickness of the barrier layer is 0.1 μm. It will be seen that the reproduction output of a pseudo gap is sufficiently suppressed in a silicon concentration range between 8 and 25 weight percent.

TABLE 1

|    |         | silicon (wt %) |     |     |     |     |     |     |    |    |         |
|----|---------|----|-----|-----|-----|-----|-----|-----|----|----|---------|
|    |         | 0  | 1.8 | 5.0 | 8.0 | 12  | 15  | 18  | 25 | 30 | sendust |
| Hc | 700° C. | 50 | 55  | 16  | 5   | 3.2 | 4.7 | 13  | —  | —  | 8.0     |
|    | 600° C. | 25 | 20  | 15  | 4.2 | 2.9 | 3.1 | 3.9 | 4.5| 18 | 7.8     |

Table 2 shows the regularity of crystal structure of the laminated layer of the barrier layer and sendust layer with respect to the silicon concentration of the barrier layer. The thickness of the barrier layer is 0.1 μm and the sendust layer is 0.3 μm. The regularity of crystal structure is represented by the degree of X-ray diffraction peak of the (111) face and (113) face. The laminated layer has a superstructure of DO3. Because of the DO3 structure, the barrier layer of iron alloy has a preferable soft magnetic characteristic.

TABLE 2

|       |         | silicon (wt %) |     |     |     |      |      |      |      |      |         |
|-------|---------|---|-----|-----|-----|------|------|------|------|------|---------|
|       |         | 0 | 1.8 | 5.0 | 8.0 | 12.0 | 15.0 | 18.0 | 25.0 | 30.0 | sendust |
| 111 peak | 700° C. | X | X | X | ○ | ⊙ | ○ | Δ | — | — | Δ |
|       | 600° C. | X | X | X | ○ | ⊙ | ○ | ○ | ○ | Δ | Δ |
| 113 peak | 700° C. | X | X | X | ○ | ○ | ○ | X | — | — | X |
|       | 600° C. | X | X | X | ○ | ○ | ○ | ○ | ○ | X | X |

⊙: very high
○: high
Δ: low
X: very low

Figure 3:
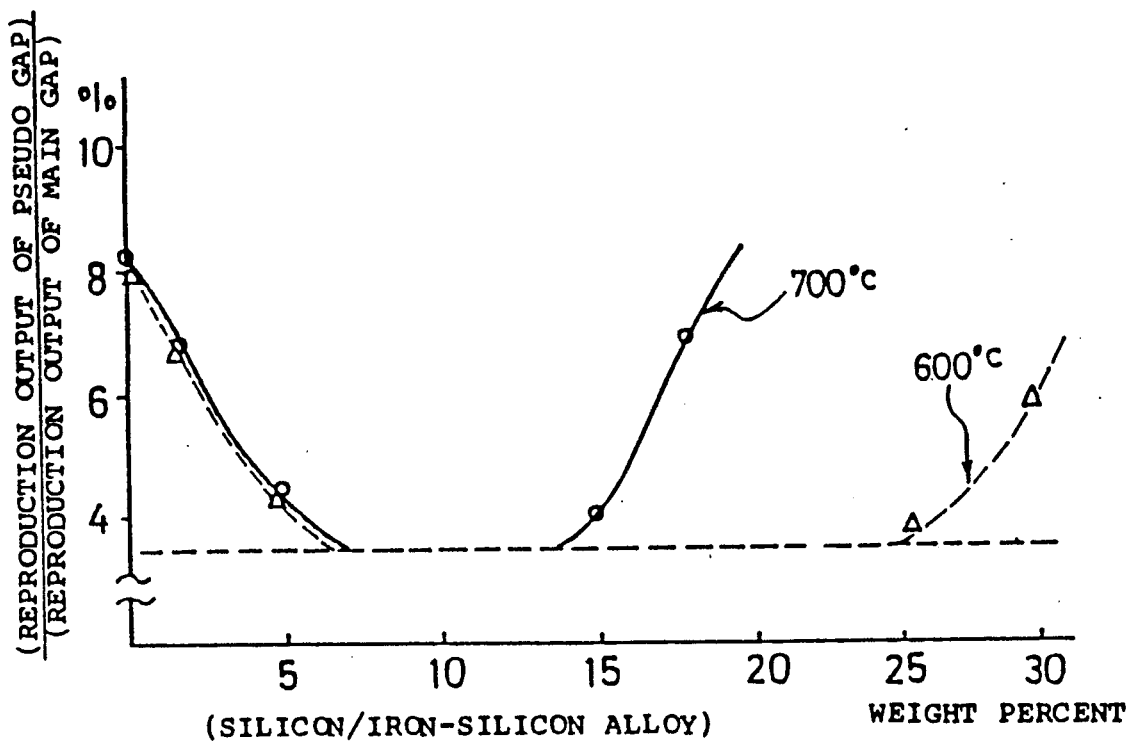
FIG. 3 is a graph showing a relationship between the silicon concentration of the barrier layer of a silicon-iron alloy and the reproduction output ratio of a pseudo gap of a MIG head.

FIG. 3 shows relationships between the silicon concentration of the barrier layer and the reproduction output ratio of the pseudo gap of an MIG head of the present invention. The solid line shows the characteristic of an MIG head produced at glass joining temperature of 700° C. and the dotted line shows at 600° C. The dotted line parallel with the X-axis shows a noise level of an electromagnetic converter system used for the measurement of the reproduction output ratio. When the silicon concentration exceeds 15%, the output ratio rises in the case of the glass joining at 700° C. This is caused by floating of the barrier layer from the ferrite core, because of the difference between thermal expansions of both materials.

From the foregoing, it will be understood that the MIG head having a silicon concentration between 8 and 15 weight percent (at glass joining temperature of 700° C. and more) and the MIG head having a silicon concentration between 8 and 25 wt % (at 600° C.) exhibit following facts, respectively.

1) The barrier layer of iron-silicon alloy has a low coercive force Hc compared with the sendust layer having the same thickness, whereby it is inferred that a magnetic deteriorated layer is not formed on interfaces between the sendust layer and the core.
2) The laminated layer of barrier layer and sendust layer has a DO3 structure and a regular structure of crystal.
3) The reproduction output ratio of the pseudo gap has a value less than 3% which is approximately equal to the noise level of the electromagnetic converter system (the dotted line of FIG. 3), and hence reproduction outputs of the pseudo gap were not observed.

Thus, not only does the barrier layer, according to the present invention, has excellent magnetic characteristics, but also gives preferable soft magnetic characteristics to the sendust layer formed thereon.

EXAMPLE 2

Figure 4:
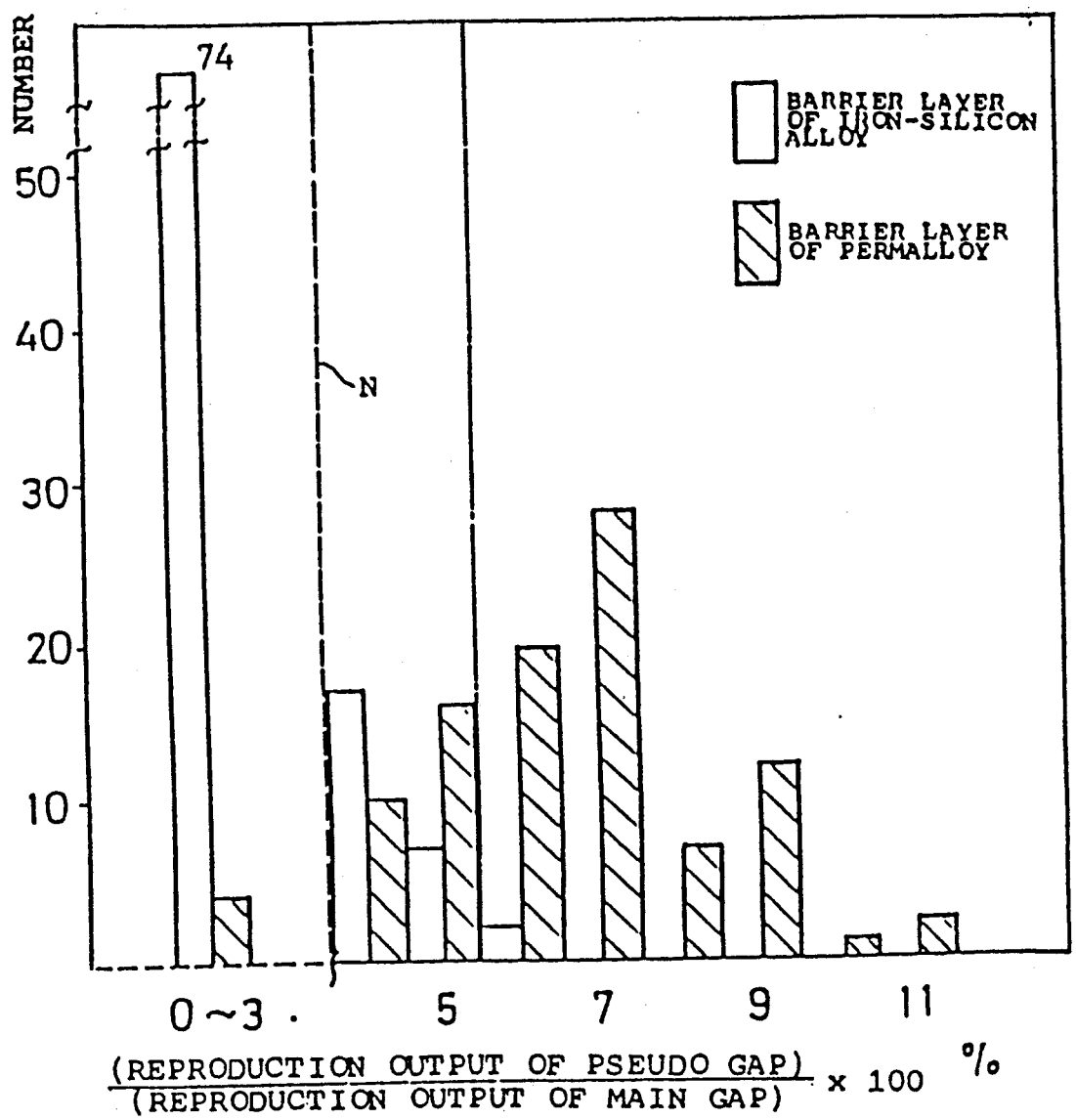
FIG. 4 is a histogram showing the results of the comparison between a barrier layer of iron-silicon alloy and a barrier layer of permalloy.

An MIG head has a barrier layer having silicon concentration of 18 weight percent, and a sendust layer on the barrier layer. The gap length of the head is 0.3 μm and track width is 40 μm. One hundred pieces of the MIG head were manufactured at joining temperature of 600° C. On the other hand, one hundred pieces of an MIG head having a barrier layer of permalloy were manufactured in the same manner as the former head. Reproduction output ratios of pseudo gaps of both MIG heads were compared with each other. FIG. 4 is a histogram showing results of the comparison, in which the number of heads having a predetermined ratio is represented at every ratio. The line N of noise level in the graph is the same as the noise level line of FIG. 3. The applicants regard an MIG head having a ratio more than 5% as poor. It will be seen that most of MIG heads of the present invention have small reproduction output ratios of the pseudo gap. On the other hand, most of MIG heads having the barrier of permalloy have large reproduction output ratios.

EXAMPLE 3

An MIG head has a barrier layer of iron including nitrogen of 8 atomic percent and a sendust layer on the barrier layer. The barrier layer is formed by vacuum deposition in the ambience of nitrogen and argon. The laminated layer of the barrier layer and the sendust layer exhibits Hc of 2.5 and has a regular crystal structure of DO3 structure.

Figure 5:
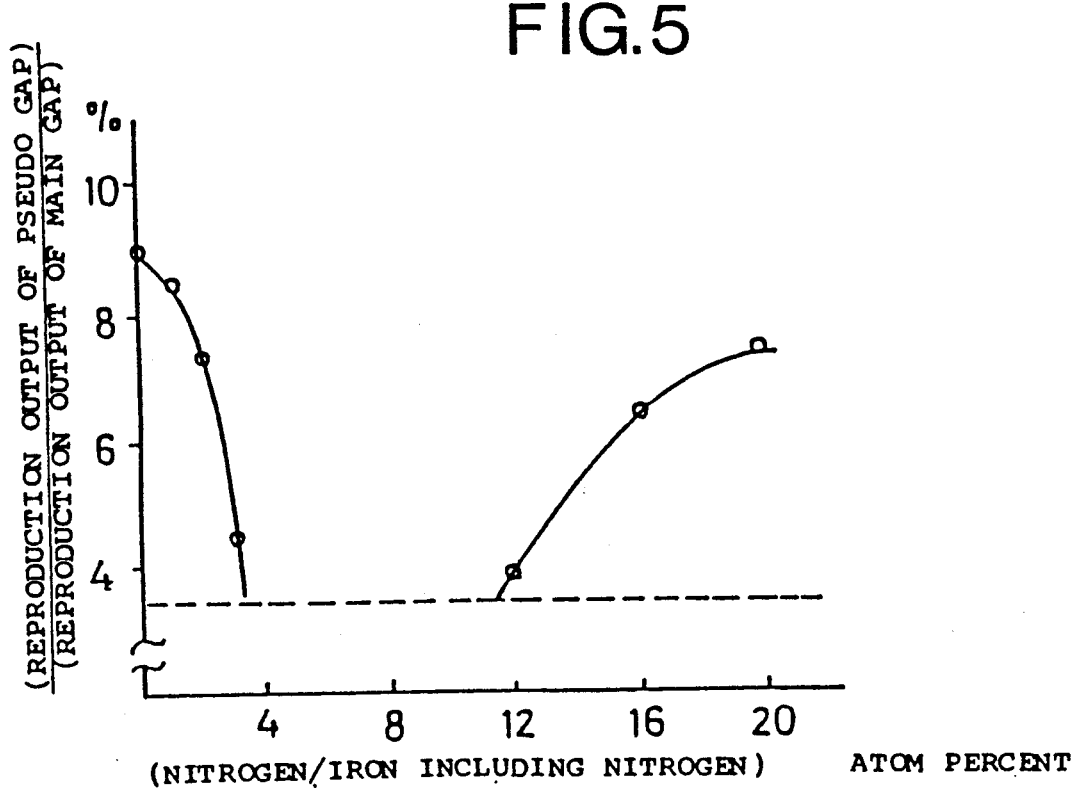
FIG. 5 is a graph showing the relationship between the atomic percentage of nitrogen of a barrier layer of iron including nitrogen and the reproduction output ratio of a pseudo gap of a MIG head.

FIG. 5 is a graph showing a relationship between the atomic percentage of nitrogen and the reproduction output ratio of the pseudo gap of the MIG head of the example. The dotted line is the same noise level as FIG. 3. The MIG head having the barrier layer between 4 atomic nitrogen and 10 atomic nitrogen has a small reproduction output ratio of the pseudo gap.

EXAMPLE 4

An MIG head has a barrier layer comprising a laminated layer consisting of an iron-silicon alloy layer having the silicon concentration of 14 weight percent and having the thickness of 0.05 μm, and a permalloy layer of 80 wt % iron having the thickness of 0.05 μm. Further, a sendust layer is formed on the laminated barrier layer to form a laminated layer. The laminated layer has Hc of 2.5 and DO3 structure. The MIG head of the example exhibits a small reproduction output ratio of the pseudo gap. Even if the silicon concentration is changed as disclosed in FIG. 3, similar effects may be obtained.

EXAMPLE 5

An MIG head has a barrier layer of iron-gallium alloy having the gallium concentration of 16 weight percent and a sendust layer on the barrier layer. Any MIG head joined at 600° C. or 700° C. has a small reproduction output ratio of the pseudo gap.

Figure 6:
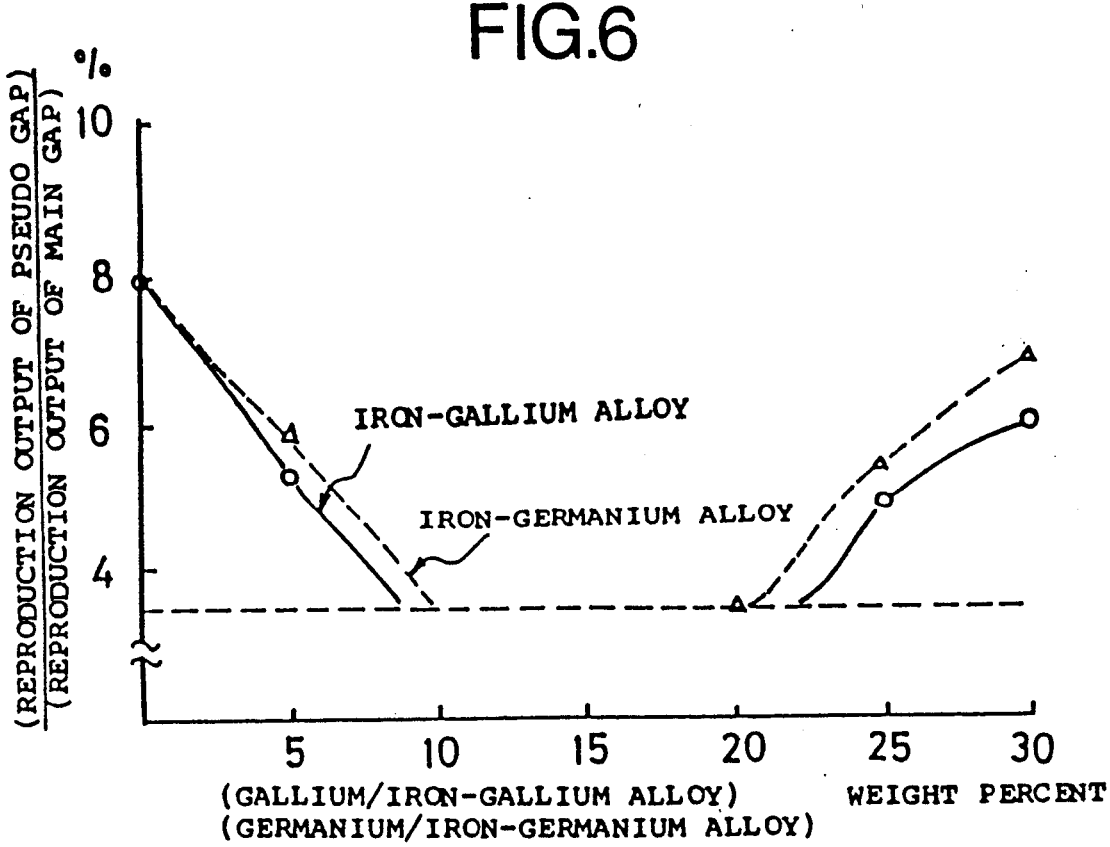
FIG. 6 is a graph showing relationships between the gallium concentration of a barrier layer of iron-gallium alloy and the reproduction output ratio of a pseudo gap and between the germanium concentration of a barrier layer of iron-germanium alloy and the reproduction output ratio of a pseudo gap of a MIG head.

FIG. 6 shows a relationship between gallium concentration and the reproduction output ratio of the pseudo gap of the example. The reproduction output of the pseudo gap is suppressed in a range between the gallium concentration of 8 weight percent and the gallium concentration of 25 weight percent.

EXAMPLE 6

An MIG head has a barrier layer of iron-germanium alloy having the germanium concentration of 14 weight percent and a sendust layer on the barrier layer. The MIG is joined at glass joining temperature of 600° C. The dotted line of FIG. 6 shows a relationship between germanium concentration and the reproduction output ratio of the pseudo gap of the MIG head. The reproduction output is suppressed in a range between 8 wt % and 25 wt %. Although the thickness of the barrier layer is 0.1 μm, an MIG head having a barrier layer between 0.05 μm and 0.2 μm can suppress the formation of the pseudo gap. Preferable thickness range of the sendust layer is between 0.1 μm and 3.0 μm.

As for iron alloy for the barrier layer, other iron alloys than the above described alloys may be employed, if they have middle magnetic characteristics between ferrite and sendust. Although sendust consists of 85% iron, 9.5% silicon, and 5.5% aluminum, the ratios of constituents may be changed. Also the ratio of constituent of permalloy containing about 45-80% nickel may be changed.

While the invention has been described in conjunction with preferred specific embodiments thereof, it will be understood that this description is intended to illustrate and not limit the scope of the invention, which is defined by the following claims.

What is claimed is:
1. A magnetic head comprising:
a pair of ferrite cores each having an end side perpendicular to a head face and disposed to form a gap therebetween;
a barrier layer of a magnetic alloy including an iron-silicon alloy having a silicon concentration of between 8 weight percent and 25 weight percent, the barrier layer being formed on the perpendicular end side of one of the cores;
a sendust layer formed on the gap side of the barrier layer; and
a gap layer of nonmagnetic material disposed in the remaining portion of the gap between the gap side of the sendust layer and the perpendicular end side of the other core.

2. A magnetic head comprising:
a pair of ferrite cores each having an end side perpendicular to a head face and disposed to form a gap therebetween;
a barrier layer of a magnetic alloy including an iron-nitrogen alloy having a nitrogen concentration of between 4 atom percent and 10 atom percent, the barrier layer being formed on the perpendicular end side of one of the cores;

a sendust layer formed on the gap side of the barrier layer; and a gap layer of nonmagnetic material disposed in the remaining portion of the gap between the gap side of the sendust layer and the perpendicular end side of the other core.

3. A magnetic head comprising:

a pair of ferrite cores each having an end side perpendicular to a head face and disposed to form a gap therebetween;

a barrier layer of a magnetic alloy and including a laminated layer consisting of an iron-silicon layer having a silicon concentration of between 8 weight percent and 25 weight percent, and a permalloy layer, the barrier layer being formed on the perpendicular end side of one of the cores;

a sendust layer formed on the gap side of the barrier layer; and a gap layer of nonmagnetic material disposed in the remaining portion of the gap between the gap side of the sendust layer and the perpendicular end side of the other core.

4. A magnetic head comprising:

a pair of ferrite cores each having an end side perpendicular to a head face and disposed to form a gap therebetween;

a barrier layer of a magnetic alloy including an iron-gallium alloy having a gallium concentration of between 8 weight percent and 25 weight percent, the barrier layer being formed on the perpendicular end side of one of the cores;

a sendust layer formed on the gap side of the barrier layer; and a gap layer of nonmagnetic material disposed in the remaining portion of the gap between the gap side of the sendust layer and the perpendicular end side of the other core.

5. A magnetic head comprising:

a pair of ferrite cores each having an end side perpendicular to a head face and disposed to form a gap therebetween;

a barrier of a magnetic alloy including an iron-germanium alloy having a germanium concentration of between 8 weight percent and 25 weight percent, the barrier layer being formed on the perpendicular end side of one of the cores;

a sendust layer formed on the gap side of the barrier layer; and a gap layer of nonmagnetic material disposed in the remaining portion of the gap between the gap side of the sendust layer and the perpendicular end side of the other core.

* * * * *